Figure 1:
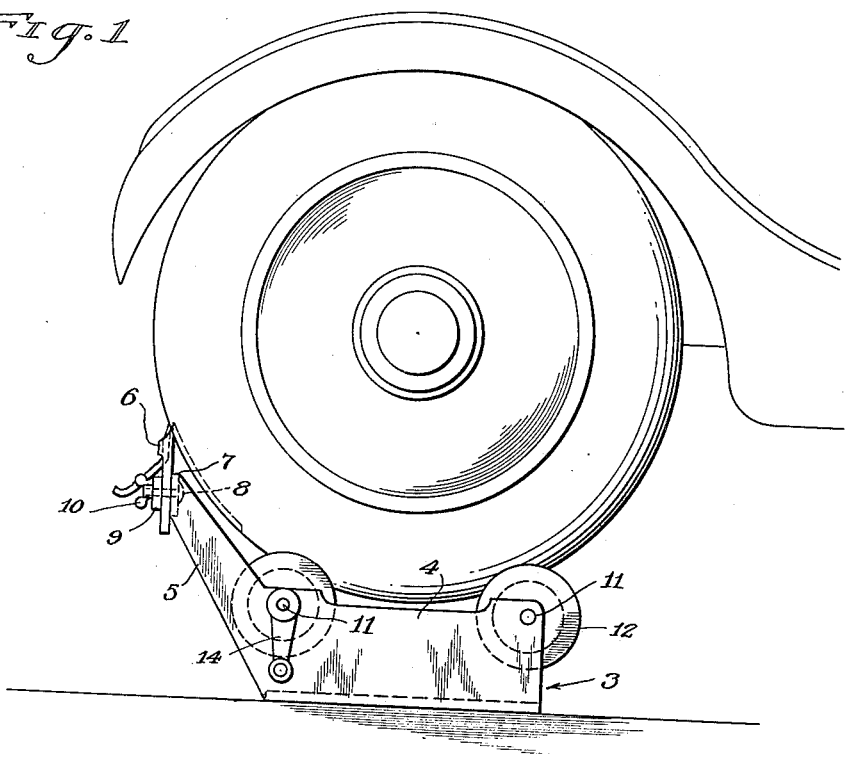

Aug. 10, 1937.　　　　J. VAYAN　　　　2,089,864
TIRE RETREADER
Filed Oct. 23, 1935

James Vayan
INVENTOR
BY Victor J. Evans & Co.
ATTORNEY

Patented Aug. 10, 1937

2,089,864

UNITED STATES PATENT OFFICE 2,089,864

TIRE RETREADER

James Vayan, New York, N. Y.

Application October 23, 1935, Serial No. 46,439

2 Claims. (Cl. 82—4)

This invention relates to devices for retreading vehicle tires and has for one of its objects the provision of a simple and economical device by which grooves or recesses may be cut in a tire so as to reproduce a non-skid tread surface thereon.

Another object of my invention is to provide a device of the character indicated which may be adjusted to fit the various sizes of tires in use and which, being simple to operate, may be readily applied by the average car owner himself without necessitating the removal of the tire from the vehicle.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described and, therefore, such changes and modifications may be made therein as do not affect the spirit of the invention nor exceed the scope thereof as expressed in the appended claims.

Figure 2:
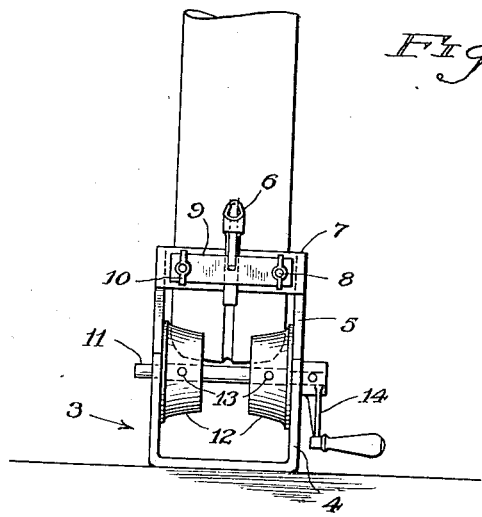

In the drawing:

Fig. 1 is a side elevational view of my device applied to a vehicle tire in re-treading same; and Fig. 2 is a front end elevational view, as shown in Fig. 1.

Referring now to the drawing for a more detailed description thereof, the numeral 3 indicates a base frame which is of channel shape comprising parallel upstanding side walls 4. One end of each side wall 4 is extended to provide a bracket 5 the purpose of which is to hold a cutting tool 6.

At the end of the bracket 5 is arranged a tool holder which comprises a cross member 7 joining the ends of the bracket arms 5. At each end of the cross member 7 and projecting forwardly from same are clamp screws 8 which pass thru suitable apertures in a clamp bar 9. The cutting tool 6 is placed between the member 7 and the bar 9 and securely clamped therein by means of the wing nuts 10 which threadedly engage the clamp screws 8. The cutting head of the tool 6 is preferably tubular so that the rubber being cut from the tire will easily pass through the tool without clogging.

At least two shafts 11 are disposed transversely between the side walls 4, being journalled in the latter. The ends of the shafts 11 are of a lesser diameter to form thrust shoulders by which to prevent the axial movement of the shafts. Each of the shafts 11 carries flanged wheels 12 which are fixed to the respective shafts by suitable means such as the set screws 13. The wheels 12 have their peripheries shaped to conform to the contour of a worn tire when inflated. One of the shafts 11 extends beyond each side wall 4, thus providing shanks at each side of the device to which a crank 14 may be attached so that the device may be conveniently operated on either the right or the left wheels of the vehicle.

When the use of the device is required each pair of wheels 12 are spaced from each other a suitable distance to properly engage the tread portion of the tire to be re-treaded. The tire on the vehicle is placed in position on my re-treading device, as shown in Fig. 1, such as by jacking up the tire and lowering same into position or by rolling the vehicle under its own power onto the wheels 12. The tool 6 is then clamped in position, its cutting edge being pierced into the tread portion of the tire a suitable depth. The tire is then rotated toward the tool 6 by operating the crank 14. As the tire is rotated in this manner the tool cuts a complete circumferential groove into the tread of same. By resetting the tool 6 to successive positions in the clamp a series of parallel grooves may be cut in the tire, thus to reproduce a non-skid tread surface on same.

What is claimed as new is:

1. A tire grooving device comprising a base of elongate channel formation having upstanding flanges, each of said flanges being extended outwardly and upwardly in substantial parallelism to form coextensive brackets, tire carrying rollers journalled in said upstanding flanges, a transverse bar joining the free ends of said brackets, and tool holding means associated with said transverse bar and adapted to hold a cutting tool therein for grooving a tire.

2. A tire grooving device comprising a base of elongate channel formation having upstanding flanges, each of said flanges being extended outwardly and upwardly in substantial parallelism to form coextensive brackets, tire carrying rollers journalled in said upstanding flanges, a transverse bar joining the free ends of said brackets, tool holding means including a clamp bar associated with said transverse bar, clamp screws carried on said transverse bar and engaging said clamp bar to grip a tool therebetween, and a cutting tool carried in said tool holding means for grooving a tire.

JAMES VAYAN.